United States Patent
Kim et al.

(10) Patent No.: US 6,614,961 B2
(45) Date of Patent: Sep. 2, 2003

(54) METHOD OF FABRICATING A FUSED-TYPE MODE-SELECTIVE DIRECTIONAL COUPLER

(75) Inventors: Byoung Yoon Kim, Taejon (KR); Kwang Yong Song, Seoul (KR); Seok Hyun Yun, Taejon (KR)

(73) Assignee: The Korea Advanced Institute of Science and Technology, Taejon (KR)

( * ) Notice: Subject to any disclaimer, the term of this patent is extended or adjusted under 35 U.S.C. 154(b) by 110 days.

(21) Appl. No.: 09/790,436

(22) Filed: Feb. 21, 2001

(65) Prior Publication Data

US 2001/0017962 A1 Aug. 30, 2001

(30) Foreign Application Priority Data

Feb. 28, 2000 (KR) .......................................... 2000-9812

(51) Int. Cl.[7] .................................................. G02B 6/26
(52) U.S. Cl. .............................. 385/43; 65/382; 65/408
(58) Field of Search .............................. 385/43, 42, 39, 385/28, 27, 15, 29; 65/378, 382, 408, 411

(56) References Cited

U.S. PATENT DOCUMENTS

| | | | | |
|---|---|---|---|---|
| 4,828,350 A | * | 5/1989 | Kim et al. | 385/28 |
| 4,915,468 A | * | 4/1990 | Kim et al. | 385/28 |
| 5,054,874 A | * | 10/1991 | Hill et al. | 385/28 |
| 5,195,151 A | * | 3/1993 | Campbell et al. | 385/43 |
| 5,260,823 A | * | 11/1993 | Payne et al. | 359/337.21 |
| 5,410,626 A | * | 4/1995 | Okuta et al. | 385/43 |

* cited by examiner

*Primary Examiner*—Robert H. Kim
*Assistant Examiner*—Chih-Cheng Glen Kao
(74) *Attorney, Agent, or Firm*—Kenta Suzue; Wilson Sonsini Goodrich & Rosati (57) ABSTRACT

A method of fabricating a fused-type directional coupler that can be made in a simple manner. The present invention is characterized in that a pair of optical fibers satisfying a particular phase match condition are previously selected to form a fused-type directional coupler. The two optical fibers are prepared by respectively tapering and etching two identical optical fibers. The present invention can be applied to fabrication of mode-selective directional couplers utilizing symmetrical high-degree modes such as LP02 mode as well as fabrication of mode-selective directional couplers utilizing asymmetrical high-degree modes such as LP11 mode.

9 Claims, 10 Drawing Sheets

METHOD OF FABRICATING A FUSED-TYPE MODE-SELECTIVE DIRECTIONAL COUPLER

CLAIM OF PRIORITY

This application claims the benefit of priority of Korean Patent Application No. 2000-9812 filed Feb. 28, 2000.

BACKGROUND OF THE INVENTION

1. Field of the Invention

The present invention relates to a method of fabricating a directional coupler and, more particularly, to a method of fabricating a fused-type directional coupler that can be easily made and has stable characteristics.

2. Description of the Prior Art

The function of an ordinary direction coupler is to enable light that is propagating in one optical fiber to diverge into two optical fibers (2×2 directional coupler) or a plurality of optical fibers (N×N directional coupler). The directional coupler is a basic optical device that is used in almost every optical communication system. The most common technique of fabricating a directional coupler is to fabricate a fused-type directional coupler. In some special instances, polished-type directional couplers are also used.

An optical fiber taper refers to an optical fiber to the part of which heat is applied and pulled to be extended, and this process is referred to as a tapering process. Fused-type directional couplers are fabricated by such tapering process.

FIGS. 1A through 1D are diagrams illustrating the conventional method of fabricating a general 2×2 fused-type directional coupler.

Figure 1A:
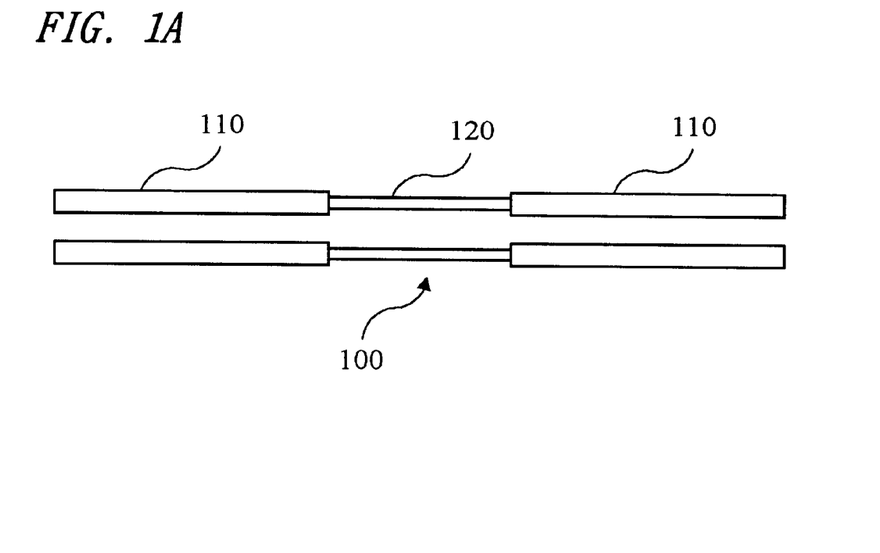
FIGS. 1A through 1D are diagrams illustrating the conventional method of fabricating a general fused-type directional coupler.
Figure 1B:
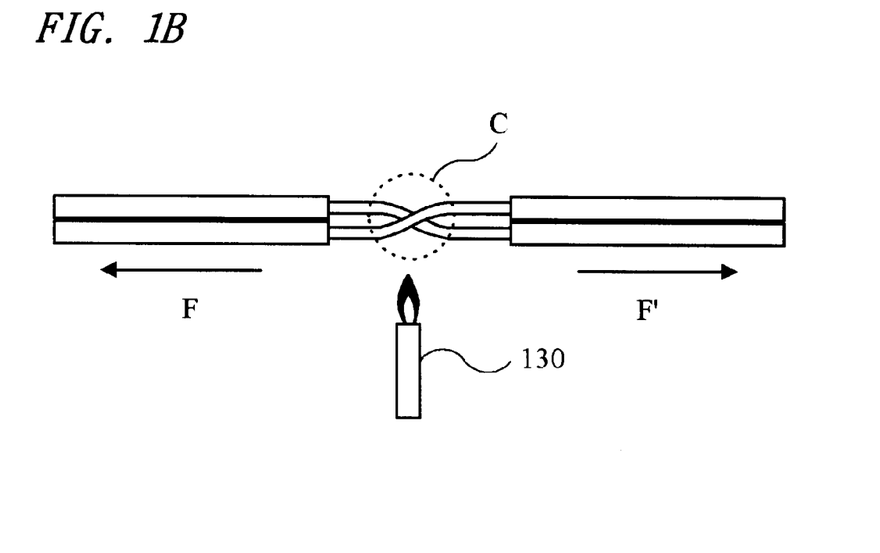
Figure 1C:
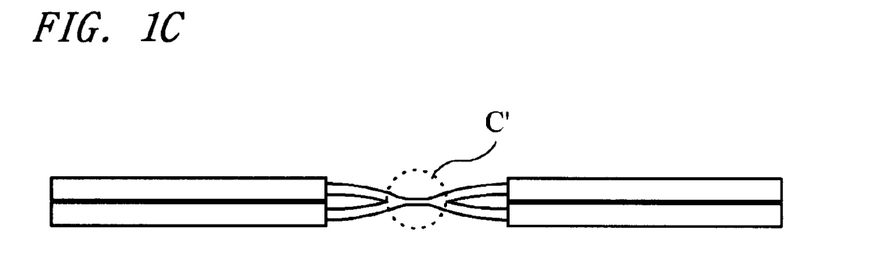
Figure 1D:
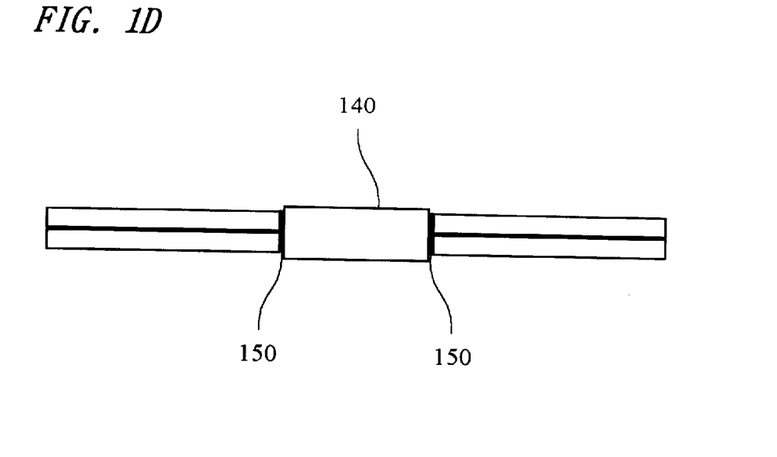

As shown in FIG. 1A, approximately 1–2 cm of the jackets 110 of two optical fibers 100 are stripped in the middle to expose the claddings 120. Subsequently, as shown in FIG. 1B, the exposed claddings 120 are put in contact, and the contact point C is heated using a torch 130 and at the same time extended in the longitudinal direction F–F' of the optical fibers so that the contact point C is fused. At the same time, an optical signal is input to the optical fibers. The heating and extending of the optical fibers are stopped when a desired amount of splitting of light is obtained. As a result, as shown in FIG. 1C, it is possible to fabricate the waist C' of the directional coupler formed by the fusion of two optical fiber tapers. The waist C' is the most slender part of the directional coupler, yet has a uniform thickness and generates the strongest directional coupling. Subsequently, as shown in FIG. 1D, the fabrication of the directional coupler is completed by fixing the waist C' with a quartz glass tube 140 and epoxy 150 in order to protect the waist C' of the directional coupler. Typically, the two optical fibers are identical types, however, they can also be different from each other or one of them may be extended in advance in order to achieve the desired wavelength characteristics or mode-coupling ratio.

Figure 2A:
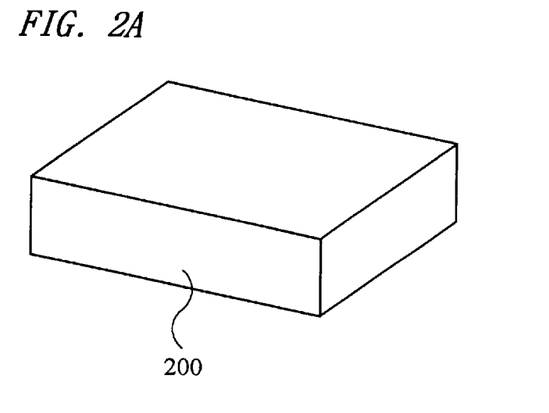
FIGS. 2A through 2E are diagrams illustrating the conventional method of fabricating a general polished-type directional coupler.
Figure 2B:
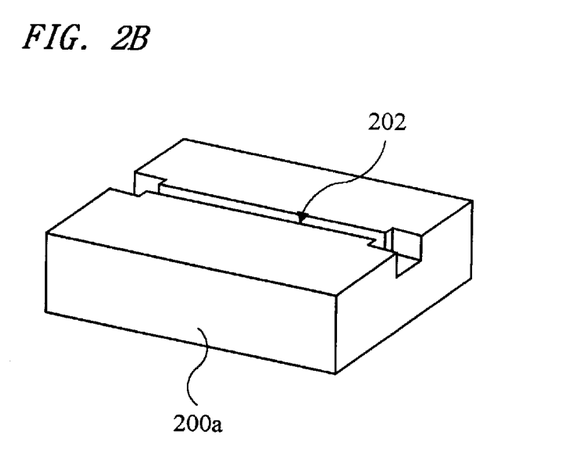
Figure 2C:
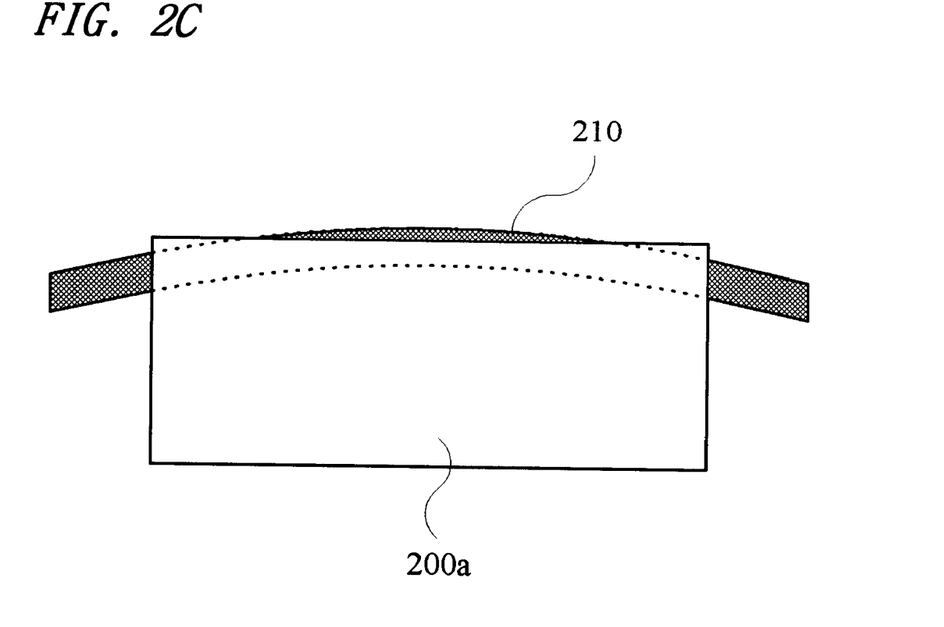
Figure 2D:
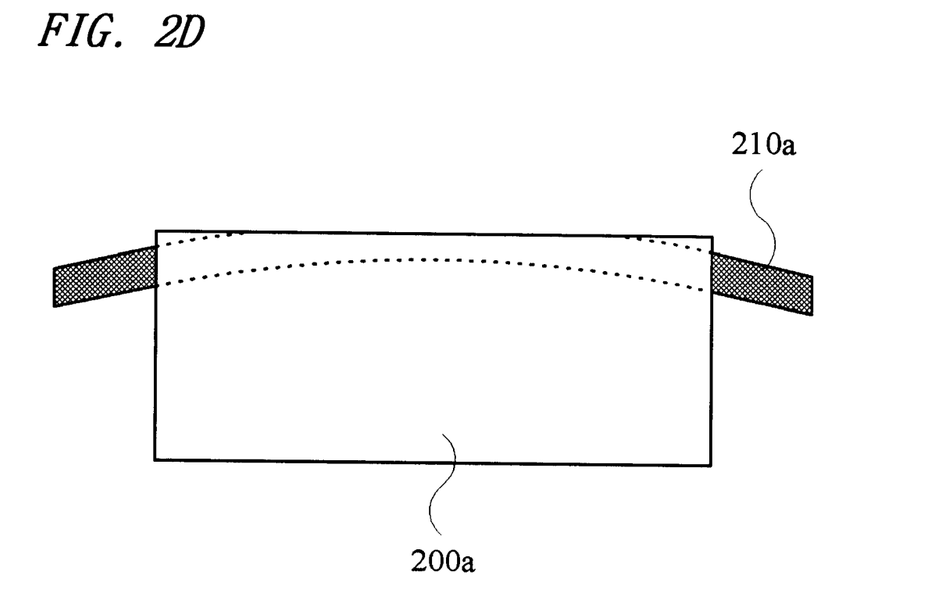
Figure 2E:
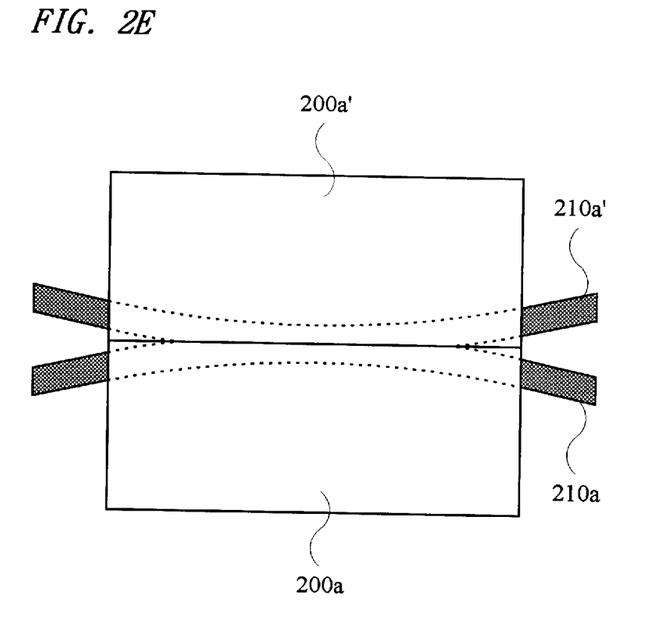

FIGS. 2A through 2E are diagrams for illustrating the conventional method of fabricating a general polished-type directional coupler. As shown in FIG. 2A, a quartz block 200 having the shape of a rectangular hexahedron is prepared. Then, as shown in FIG. 2B, a groove 202 having a certain depth suitable for the thickness of the jacket of the optical fiber is made to form a fixing support 200a. Subsequently, as shown in FIG. 2C, epoxy is used to fix the optical fiber 210 in the groove 202. Then, as shown in FIG. 2D, the block face fixing the optical fiber is polished to grind the cladding of the optical fiber in order to form a polished-type optical fiber 210a, so that a small part of the light propagating through the core of the optical fiber leaks. Then, as shown in FIG. 2E, the two blocks 200a and 200a' fabricated as illustrated above are put in contact to join the cores of the two optical fibers 210a and 210a', so that the directional coupler is completed. Such polished-type directional couplers are used in cases where the inherent birefringence (double refraction) axis present in the optical fiber core has to be adjusted. Examples of such cases include polarized directional couplers utilizing polarized optical fibers and mode-selective directional couplers utilizing an elliptical core two mode fiber ("TMF"). Such polished-type directional couplers are also used in variable directional couplers of which the coupling ratio is variable. However, polished-type directional couplers have a disadvantage that they are unstable against change of temperature or environment compared with all-fiber type directional couplers such as fused-type directional couplers, because polished-type directional couplers require use of index matching oil on the junction face in order to obtain effective directional coupling.

Figure 3A:
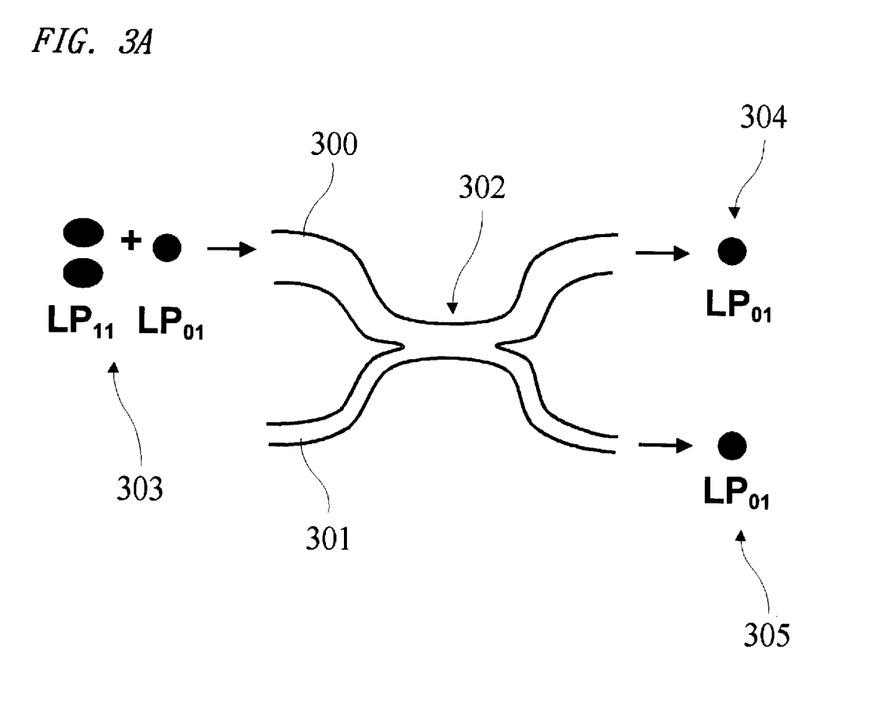
FIGS. 3A and 3B are diagrams illustrating the characteristics of a mode-selective directional coupler.
Figure 3B:
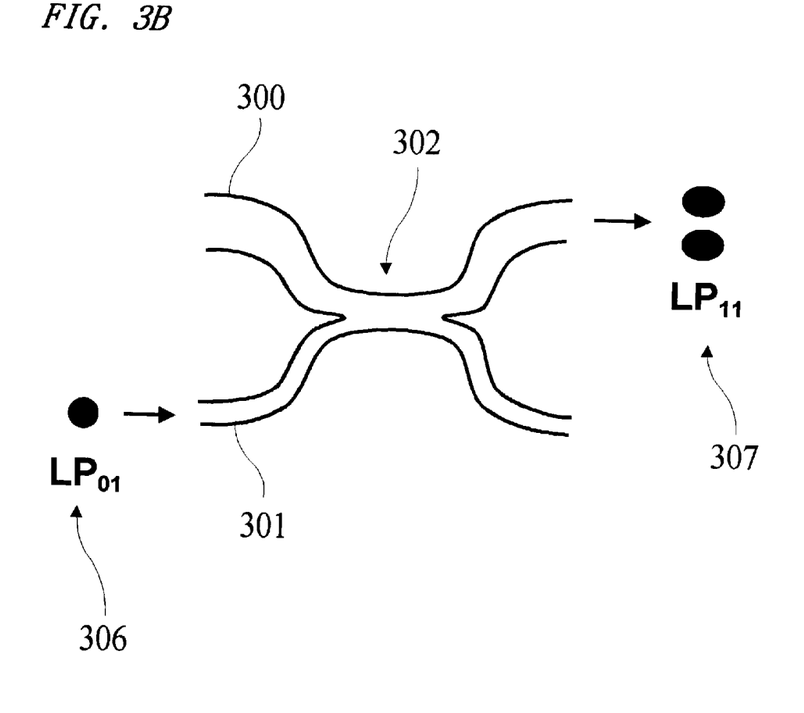

FIGS. 3A and 3B are diagrams for illustrating the functions of mode-selective directional couplers. The directional couplers shown in FIGS. 3A and 3B have common general functions irrespective of the technique (fused-type or polished-type) used to fabricate them. The basic structure is such that a TMF 300 and a single mode fiber ("SMF") 301 are joined at the coupling region 302.

The normalized frequency is a characteristic value of an optical fiber. The normalized frequency V of an optical fiber can be calculated as follows:

$$V = (2\pi/\lambda) \cdot \alpha \cdot (n_{co}^2 - n_{cl}^2)^{1/2}$$ Equation 1, where $\alpha$ is the radius of the core, $\lambda$ is the wavelength, and $n_{co}$ and $n_{cl}$ are the refractive indices of the core and the cladding, respectively.

Generally, the larger the normalized frequency V of an optical fiber is, the more modes can propagate through the optical fiber. When the normalized frequency V is between 0 and 2.405, the optical fiber becomes a SMF through which only the LP01 mode can propagate. When the normalized frequency V is between 2.405 and 3.83, the optical fiber becomes a TMF through which both the LP01 mode and the LP11 mode can propagate. When the normalized frequency V is less than about 1.4, the guidance of the fiber core becomes too weak and the electric field of the LP01 mode begins to spread out to the cladding region. In such case, if the cladding comes into contact with other material, leakage or mode coupling of light occurs. Considering the above characteristics, the normalized frequency V is typically adjusted to 0.8 for fused-type directional couplers fabricated utilizing general SMF.

Referring to FIG. 3A illustrating mode selection, when both the LP01 and LP11 modes 303 propagate through the TMF 300, the LP01 mode propagates through the coupling region 302 to be output as the LP01 mode 304 of the output terminal TMF, whereas the LP11 mode of the TMF 300 is converted to the LP01 mode 305 of the SMF 301. Also, as shown in FIG. 3B, when the LP01 mode 306 is incident to the SMF 301, it is converted to the LP11 mode 307 of the TMF in the coupling region 302.

It is preferable to have 100% efficiency in mode selection or mode conversion. The mode coupling ratio and the mode extinction ratio are two criteria from which the quality of a mode-selective directional coupler can be judged. Referring to FIG. 3B, the mode coupling ratio and the mode extinction ratio can be calculated as follows:

$$\text{Mode Coupling Ratio} = 100 \times (P_1/P_0) \quad \text{Equation 2,}$$

$$\text{Mode Extinction Ratio} = 10 \cdot \log(P_1/P_2) \quad \text{Equation 3,}$$

where $P_0$ is the power of the LP01 mode 306 incident to the SMF 301, $P_1$ is the mode-coupled power of the LP11 mode 307 in the output terminal TMF after propagating through the coupling region 302, and $P_2$ is the mode-coupled power of the LP01 mode in the output terminal TMF. The mode coupling ratio and the mode extinction ratio are typically 90% and 20 dB, respectively, and larger values are preferable in both cases.

Figure 4A:
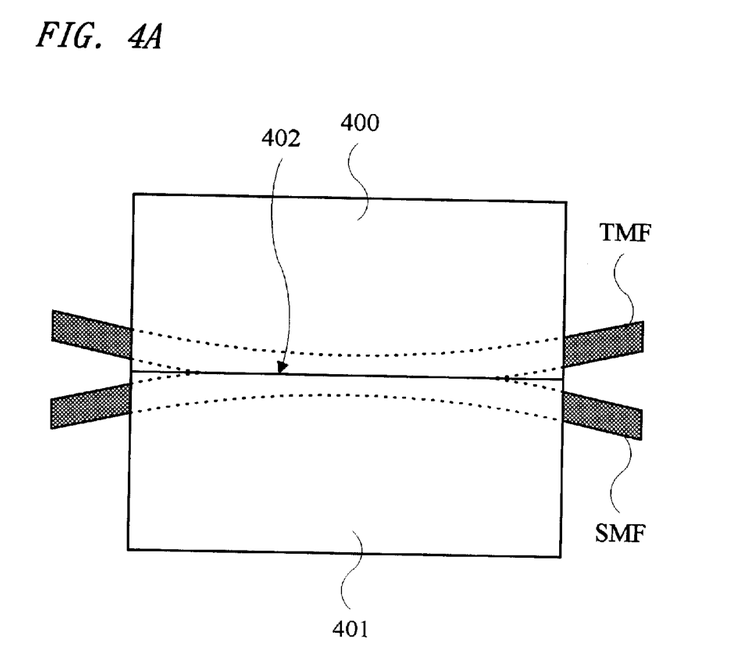
FIG. 4A is a diagram illustrating the conventional method of fabricating a mode-selective directional coupler.

FIG. 4A is a diagram for illustrating the conventional method of fabricating a polished-type mode-selective directional coupler. Referring to FIG. 4A, the SMF and the TMF are fabricated as polished blocks 400 and 401 as in general polished-type directional couplers. Then, the two blocks ±400 and 401 are juxtaposed by using index matching oil and epoxy on the face 402 of their junction. Mode-selective directional couplers fabricated according to such method require the use of a pair of SMF and TMF that satisfy the phase match condition, i.e., the condition that the propagation constants for the two modes are equal so that mode coupling is effectively brought about between the LP11 mode of the TMF and the LP01 mode of the SMF. In addition, the elliptical core TMF is preferable for practical use, because the lobe of the LP11 mode in a circular core TMF is unstable.

Figure 4B:
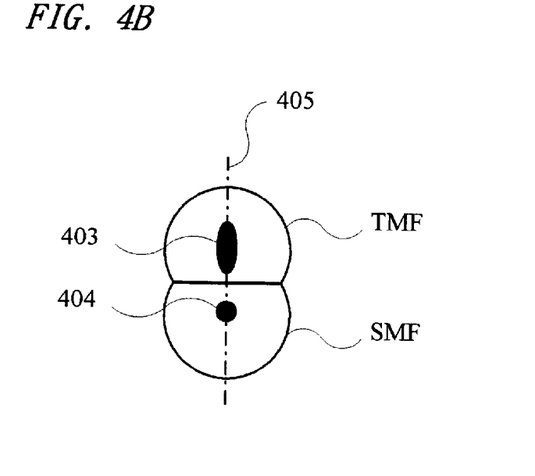
FIG. 4B is cross-sectional view of a mode-selective directional coupler fabricated according to the method illustrated in FIG. 4A.

FIG. 4B is a cross-sectional view of a mode-selective directional coupler fabricated according to the method illustrated in FIG. 4A. As shown in FIG. 4A, the direction of the junction of the elliptic core 403 of the TMF and the core 404 of the SMF should be aligned along the longer or shorter axis 405 of the elliptic core of the TMF.

The propagation constant β of a mode is in a linear relation with the effective refractive index $n_{eff}$ of the mode and can be calculated as follows:

$$\beta = (2\pi/\lambda) \cdot n_{eff} \quad \text{Equation 4,}$$

wherein λ is the wavelength. Thus, the phase match condition is satisfied when the effective refractive indices of the two modes are the same value.

Thus, it is necessary to find a pair of TMF and SMF in which the effective refractive index of the TMF LP11 mode and that of the SMF LP01 mode are the same, in order to fabricate a polished-type mode-selective directional coupler. Also, the performance of such polished-type mode-selective directional couplers is prone to be affected by change of exterior environment such as temperature, because material such as index matching oil and epoxy is used in such polished-type mode-selective directional couplers.

Figure 5:
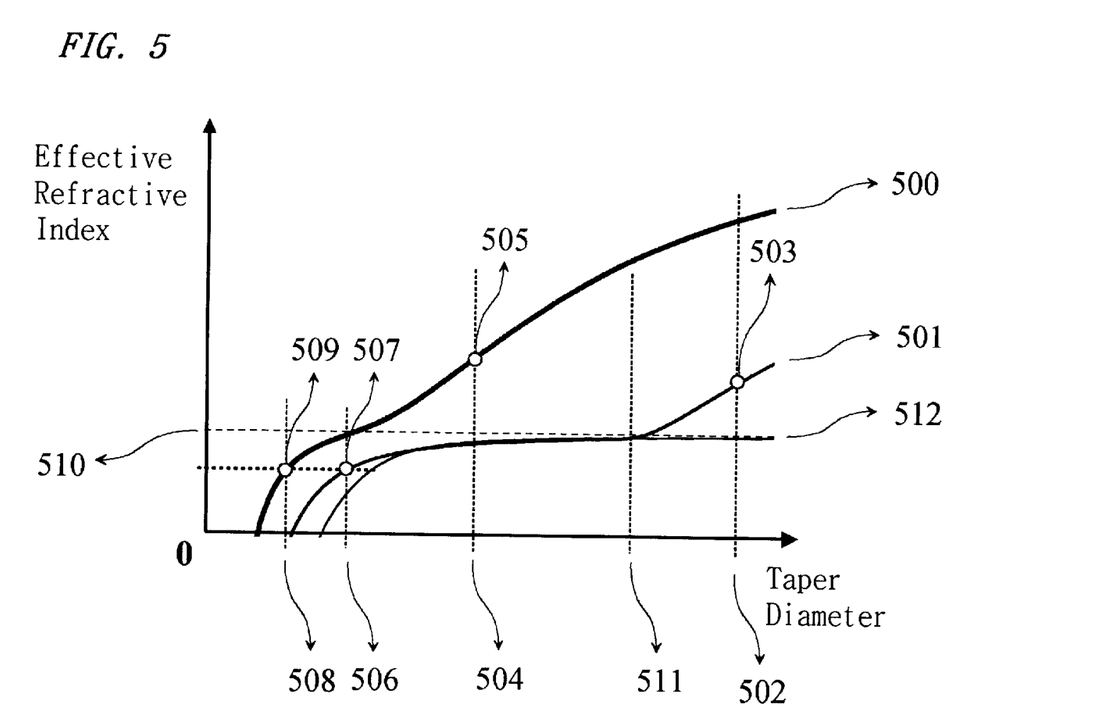
FIG. 5 is a graph illustrating the effective refractive indices of the LP02 mode, the LP11 mode, and the LP01 mode according to the diameter of the two-mode optical fiber taper.

In TMF, two modes, LP01 mode and LP11 mode, can propagate. If one end of the TMF is tapered, both the core of the optical fiber and the diameter of the cladding are reduced at the same rate. When the electrical field is calculated with respect to a TMF having a stepped refractive index distribution capable of tapering by using a Maxwell equation, it is possible to numerically calculate the mode distribution that propagates through the TMF and the effective refractive index. FIG. 5 is a graph illustrating the effective refractive indexes of the LP01 mode and the LP11 mode according to the diameter of the TMF taper calculated by using such method in a typical circular core TMF. Reference numerals 500 and 501 refer to the effective refractive indexes of the LP01 mode and the LP11 mode, respectively, and the dotted line referred to by reference numeral 510 indicates the refractive index of the TMF cladding.

A cladding mode is a mode having an effective refractive index that is smaller than the refractive index of the cladding. Thus, the cladding mode cannot propagate through ordinary optical fibers covered by a jacket but can propagate through regions such as the waist of directional couplers where the jacket is uncovered and comprised of cladding and air. The LP02 mode is the lowest order mode among the cladding modes of the TMF. On the contrary, the core mode is a mode having an effective refractive index that is greater than the refractive index of the cladding. Thus, the core mode can propagate through ordinary optical fibers.

The solid line referred to by reference numeral 512 indicates the effective refractive index curve of the LP02 mode, the lowest-order mode among cladding modes, wherein the effective refractive index is smaller than the refractive index of the cladding. Referring to FIG. 5, the effective refractive indices of the two modes in the TMF become smaller as the diameter of the taper becomes smaller by tapering. Finally, when the effective refractive index of the LP11 mode becomes equal to the refractive index 510 of the cladding as indicated by reference numeral 511, then the LP11 mode cannot propagate through the optical fiber that has a jacket. The normalized frequency V at this point is 2.405. Thus, as in a SMF, only the LP01 mode can propagate through the TMF taper having a smaller diameter than such point.

After preparing two TMF's of equal diameter 502, one of them can be tapered to an appropriate diameter 504. When this TMF taper is joined with the other TMF and both of them are extended while being heated, the diameters of the two optical fibers are reduced at the same rate. The effective refractive index 505 of the LP01 mode in the TMF taper and the effective refractive index 503 of the LP11 mode in the other TMF are also reduced as the diameters are reduced. When the diameters of the TMF taper and the other TMF are reduced at the same rate to certain diameter values 508 and 506, the effective refractive index 509 of the LP01 mode in the TMF taper becomes equal to the effective refractive index 507 of the LP11 mode in the other TMF. This condition is referred to as the phase matching condition. Accordingly, it is possible to fabricate a fused-type mode-selective directional coupler by fusing a TMF taper and an ordinary TMF and extending them so that the final diameters satisfy the phase matching condition as illustrated above. However, the final diameters of the TMF taper and the other TMF that satisfy the phase matching condition between the LP01 mode of the TMF taper and the LP11 mode of the other TMF depends on the initial value of the diameter of the TMF taper.

The differences in the characteristics of the fused-type mode-selective directional coupler according to the initial values of the diameters of the TMF taper and the other TMF will be illustrated hereinafter by describing the prior art.

Figure 6:
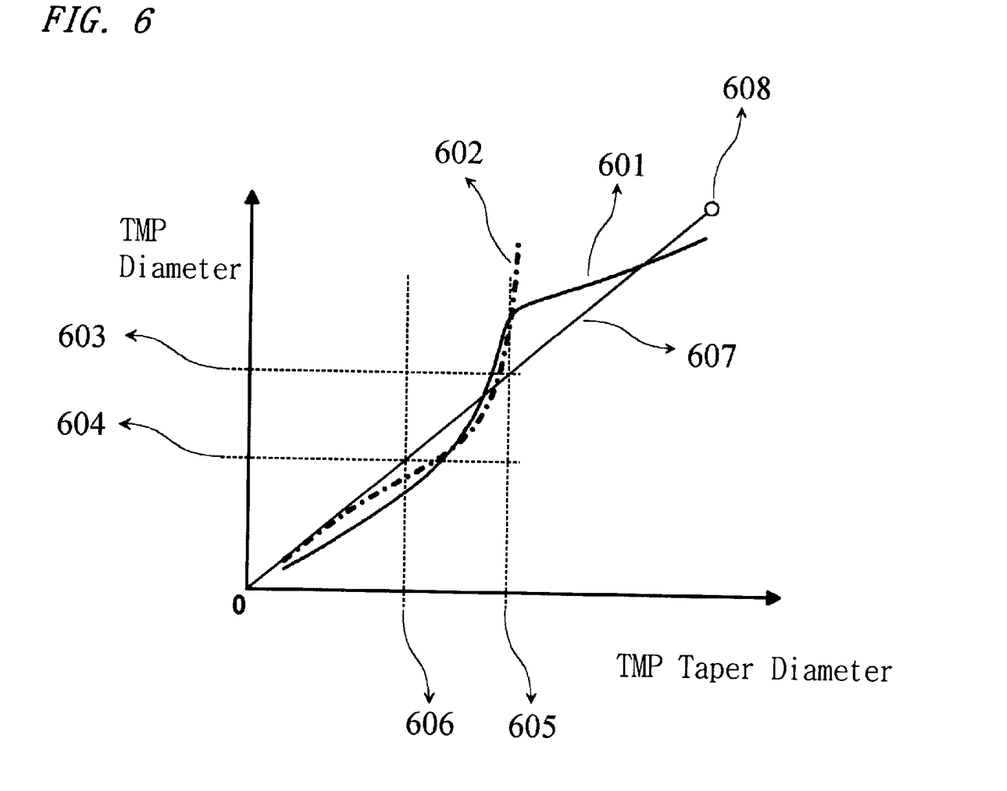
FIG. 6 is a graph of the phase matching curve of the fused-type mode-selective directional coupler fabricated by using a TMF and its taper.

Fused-type mode-selective directional couplers have been researched in the past by using a TMF taper and an ordinary TMF. FIG. 6 is a graph illustrating the phase matching condition curve when a fused-type mode-selective directional coupler is fabricated using a step index TMF and its taper. That is, FIG. 6 is a graph showing the respective diameter values of the TMF and the TMF taper when the phase matching condition occurs between the LP01 mode and the LP11 mode in FIG. 5. In FIG. 6, the curve 601 indicated by a solid line represents the theoretical value of the diameters of the TMF and the TMF taper that satisfy the phase matching condition between the LP11 mode of the TMF and the LP01 mode of the TMF taper. In addition, the curve 602 indicated by a dotted line represents the theoretical value of the diameter of the optical fiber that satisfies the phase matching condition between the LP02 mode of the TMF and the LP01 mode of the TMF taper. Because the light mode-coupled to the LP02 mode disappears when it reaches the jacket, mode-coupling to the LP02 mode is a main factor to loss of light in a fused-type mode-selective directional coupler.

Once the initial diameter 608 of the TMF and the TMF taper is determined, the diameters of the two optical fibers are reduced like a straight line ("coupler fabrication straight line") 607 toward the origin. It is preferable for the coupler fabrication straight line and the curve satisfying the phase matching condition to be parallel and close within an error of around 1.5 $\mu$m of the TMF diameter (within effective refractive index order of $10^{-4}$) in order to obtain effective mode coupling. However, when the coupler is fabricated by using a TMF and its taper, the straight line and the curve differ beyond the error limit in the mode coupling regions 603–604 and 605–606.

The mode coupling region is a region in which the normalized frequency V of the TMF is between 1.4 and 2.405. In the mode coupling region, the effective refractive index of the TMF LP11 mode is smaller than the refractive index of the cladding, and the effective refractive index of TMF LP01 mode has not reached the index of cladding yet. Thus, mode coupling between the TMF LP11 mode and the LP01 mode in the TMF taper is carried out effectively. At the same time, the TMF LP01 mode does not participate in any coupling of light so that a large mode extinction ratio can be achieved. Accordingly, it is preferable to fabricate the fused-type mode-selective directional coupler in the mode coupling region.

As shown in FIG. 6, the LP01-LP02 mode curve 602 is very close to the LP01-LP11 mode curve 601 in the mode coupling regions 603–604 and 605–606. Thus, when the fused-type mode-selective directional coupler is fabricated by using the TMF and its taper, mode coupling to the LP02 mode occurs along with mode coupling to the LP11. Accordingly, a significant amount of loss of light occurs, which is not desirable.

SUMMARY OF THE INVENTION

Conventional polished-type mode-selective directional couplers have a disadvantage that their performance is deteriorated with change in temperature, because other material such as index matching oil and epoxy is used. Therefore, it is an object of the present invention to provide a method of fabricating a fused-type mode-selective directional coupler in all-optical-fiber form that is stable against change in temperature because no material other than optical fiber is used but still has characteristics comparable to conventional polished-type mode-selective directional couplers.

Because it was impossible to change the characteristics of optical fibers in conventional methods of fabricating a polished-type mode-selective directional coupler, it was necessary to find out the characteristics of each of the optical fibers empirically in order to find a pair of optical fibers of which the effective refractive index of the TMF LP11 mode is equal to the effective refractive index of the SMF LP01 mode. Thus, it is another object of the present invention to provide a method of fabricating a mode-selective directional coupler that enables easy selection of a pair of optical fibers for the directional coupler.

It is still another object of the present invention to provide a method of fabricating a fused-type mode-selective directional coupler that is smaller and lighter than conventional polished-type directional couplers but is cheaper and takes less time to fabricate while still having almost the same characteristics as conventional polished-type directional couplers.

To this end, a method of fabricating a fused-type mode-selective directional coupler in which a mode-coupling ratio between a first mode $M_1$ and a second mode $M_2$ equals a certain value is provided, the method comprising the steps of preparing a first optical fiber and a second optical fiber, the first and second optical fibers each having a core and a cladding, parts of a jacket of each of the first and second optical fibers being removed, the first optical fiber having a cladding diameter of $D_1$ and a normalized frequency of $V_1$, and the second optical fiber having a cladding diameter of $D_2$ and a normalized frequency of $V_2$, said $V_1$ being less than said $V_2$; putting in contact the claddings of the first and second optical fibers to form a junction; measuring the mode-coupling ratio between the first mode $M_1$ of the first optical fiber and the second mode $M_2$ of the second optical fiber; extending the first and second optical fibers in longitudinal directions while fusing the junction; and stopping extending the first and second optical fibers when the mode-coupling ratio between the first mode $M_1$ and the second mode $M_2$ reaches the certain value.

It is preferable that the step of preparing a first optical fiber and a second optical fiber comprises tapering the first optical fiber to a cladding diameter of $D_1$ and etching the second optical fiber to a cladding diameter of $D_2$. The step of preparing a first optical fiber and a second optical fiber may also comprise tapering and etching the first and second optical fibers, respectively, the first and second optical fibers having an identical structure, wherein the first and second optical fibers having the identical structure are either single-mode optical fibers or two-mode optical fibers.

The first mode $M_1$ may be an LP01 mode and the second mode $M_2$ may be an LP11 mode. Also, the first mode $M_1$ may be a core mode and the second mode $M_2$ may be a cladding mode.

The certain value at which extending of the first and second optical fibers is stopped may be a maximum value of the mode-coupling ratio between the first mode $M_1$ and the second mode $M_2$.

The first and second optical fibers may be two-mode optical fibers having elliptic cores, and arrangement planes of the first and second optical fibers may be parallel with the elliptic cores at the junction such that mode-coupling occurs in a stable manner only in one lobe direction of an LP11 mode.

In addition, the first and second optical fibers may be elliptic-core optical fibers, and modes participating in mode-coupling are fundamental mode of either one of the first and second optical fibers and anti-symmetric higher-order mode such as an LP12 mode of the other one of the first and second optical fibers. In addition, the first and second optical fibers may be circular core optical fibers, and modes participating in mode-coupling are fundamental mode of either one of the first and second optical fibers and symmetric higher-order mode such as an LP02 mode of the other one of the first and second optical fibers.

DESCRIPTION OF THE PREFERRED EMBODIMENT

The preferred embodiments of the present invention will be described hereinafter with reference to the attached drawings.

Figure 7A:
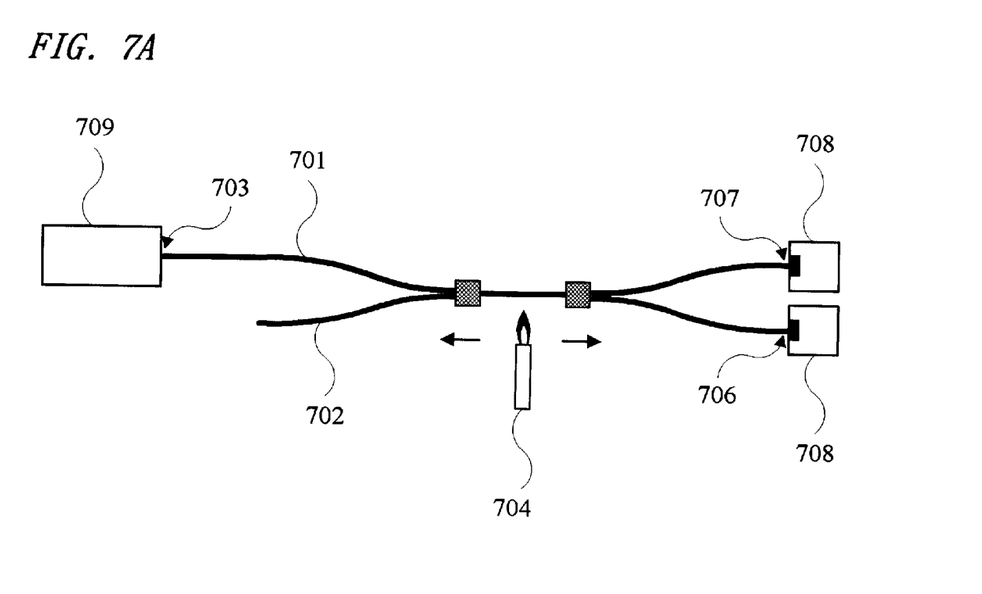
FIG. 7A is a diagram illustrating the method of fabricating a mode-selective directional coupler according an embodiment of the present invention.

FIG. 7A is a diagram illustrating the method of fabricating a mode-selective directional coupler according an embodiment of the present invention. The optical fiber has a stepped refractive index distribution, and the diameter of the core is 4.3 $\mu$m, the diameter of the cladding is 125 $\mu$m, and the normalized frequency V is 3.1 when the wavelength is 1.06 $\mu$m. The first and second TMF's were prepared by cutting the above TMF's into two 2-meter pieces. The torch used for fabricating the taper and the fused-type directional coupler employs propane gas and oxygen, where the amount of propane gas is 4 sccm and is completely burned.

The Maxwell equation for the first TMF is calculated to obtain a graph of the effective refractive index such as that shown in FIG. 5. Also, the Maxwell equations are calculated with regard to cladding in the second TMF etched to 110, 100, 90, 80, 70, 60, and 50 $\mu$m to obtain a graph of the effective refractive index such as that shown in FIG. 5. Then, the effective refractive index value of the LP01 mode in the first TMF is sampled, and also the effective refractive index values of the LP11 and LP02 modes in the second TMF etched to various diameters are sampled. These values are used to obtain graphs, in the form of that showed in FIG. 6, for diameters that satisfy the phase matching condition with respect to the LP01-LP11 mode and the LP01-LP02 mode, vis-à-vis each of the diameters of the etched second TMF.

Figure 8:
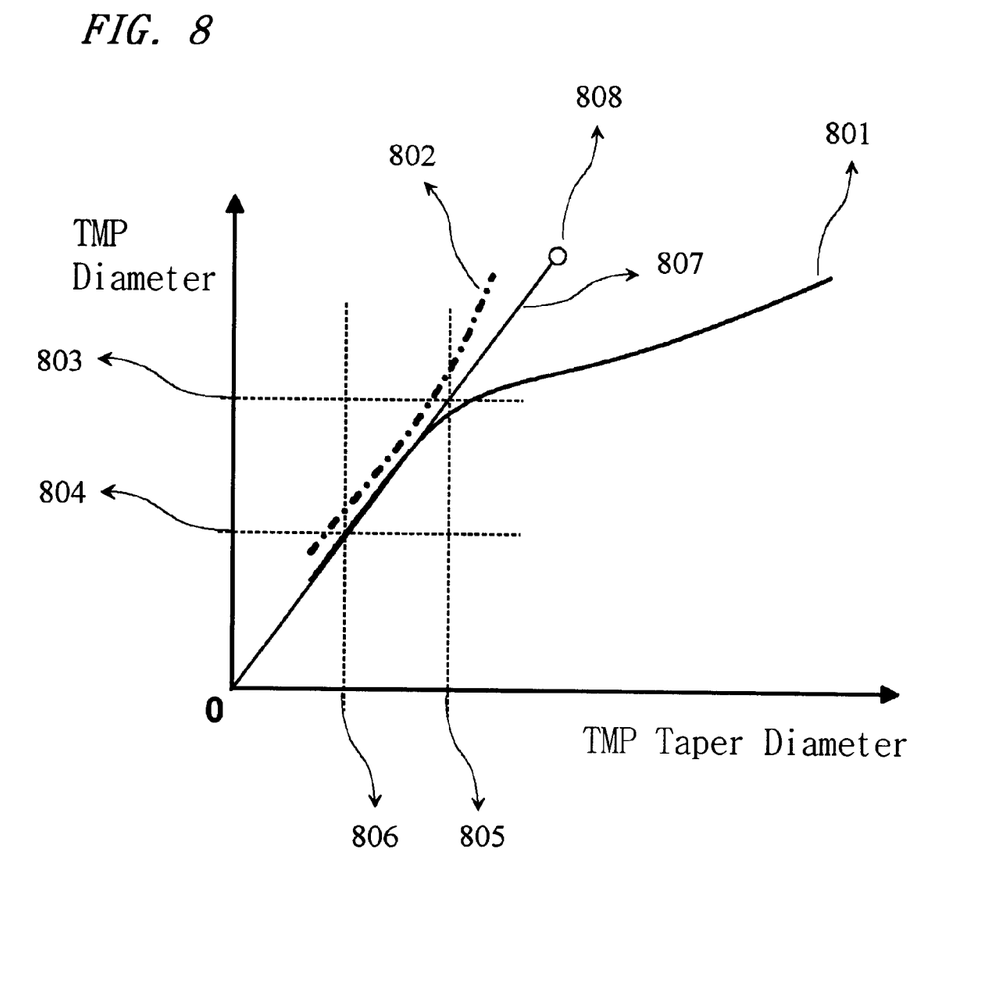
FIG. 8 is a graph illustrating the phase match curve of the fused-type mode-selective directional coupler fabricated according to the embodiment of the present invention.

In the embodiment of the present invention, the graph (FIG. 8) for a diameter of 50 $\mu$m of the etched second TMF was selected among these graphs to fabricate the fused-type mode-selective directional coupler. In order to eliminate mode-coupling to the LP02 mode and effectively cause mode-coupling to the LP11 mode, the graph 801 of the LP01-LP11 mode and the graph 802 of the LP01-LP02 mode should be such that the diameters of the TMF are separated by more than 2 $\mu$m in the mode-coupling regions 803–804 and 805–806 as shown in FIG. 8. Also, the difference between the coupler-fabrication straight line 807 toward the origin and the graph 801 of the LP01-LP11 mode should be maintained less than 1.5 $\mu$m in the mode-coupling regions 803–804 and 805–806 from a certain initial diameter value 808.

By using FIG. 8 obtained as illustrated above, the jacket of the first TMF is removed by 2 cm then, that part is tapered to a cladding diameter of 30 $\mu$m to match the initial diameter value 808. The jacket of the second TMF is also removed by 2 cm, and that part is chemically etched to a cladding diameter of 50 $\mu$m.

Referring to FIG. 7A, the second TMF 702 which was etched to a cladding diameter of 50 $\mu$m is used as the LP11 mode end, and the first TMF taper 701 which was tapered to a cladding diameter of 30 $\mu$m is used as the LP01 mode end. Thereafter, light is input to one end 703 of the first TMF taper to propagate the LP01 mode by using a light source 709 having a wavelength of 1.06 $\mu$m. Those two optical fibers are fused by heating them using the torch 704 and extended along the two directions of the arrows. Also, the intensity of the light output from the first TMF taper and the two ends 707 and 706 of the etched second TMF is measured using the optical sensor 708. The intensity of the LP11 mode at the one end 706 of the etched second TMF is measured, and the extension of the optical fiber is stopped when the calculated mode-coupling ratio reaches a desired value. When the extension is stopped, the fused-type mode-selective directional coupler is completed. The fused-type mode-selective directional coupler fabricated when the mode-coupling ratio reached its maximum has the following characteristics: the diameter of the first TMF taper is 18 $\mu$m; the diameter of the etched second TMF is 30 $\mu$m; and the normalized frequency V is 1.8. Here, it is possible to obtain a large mode-extinction ratio because the LP01 mode in the etched second TMF is included in the mode-coupling region that has not participated in the mode-coupling. In order to protect the waist-portion of the coupler as in ordinary fused-type directional couplers, the waist-portion is fixed using quartz glass tube and epoxy similar to those shown in FIG. 1D. When the mode-coupling ratio reaches its maximum in the fused-type mode-selective directional coupler fabricated as illustrated above, the mode-coupling ratio was 92% and the mode-extinction ratio was 25 dB.

Figure 7B:
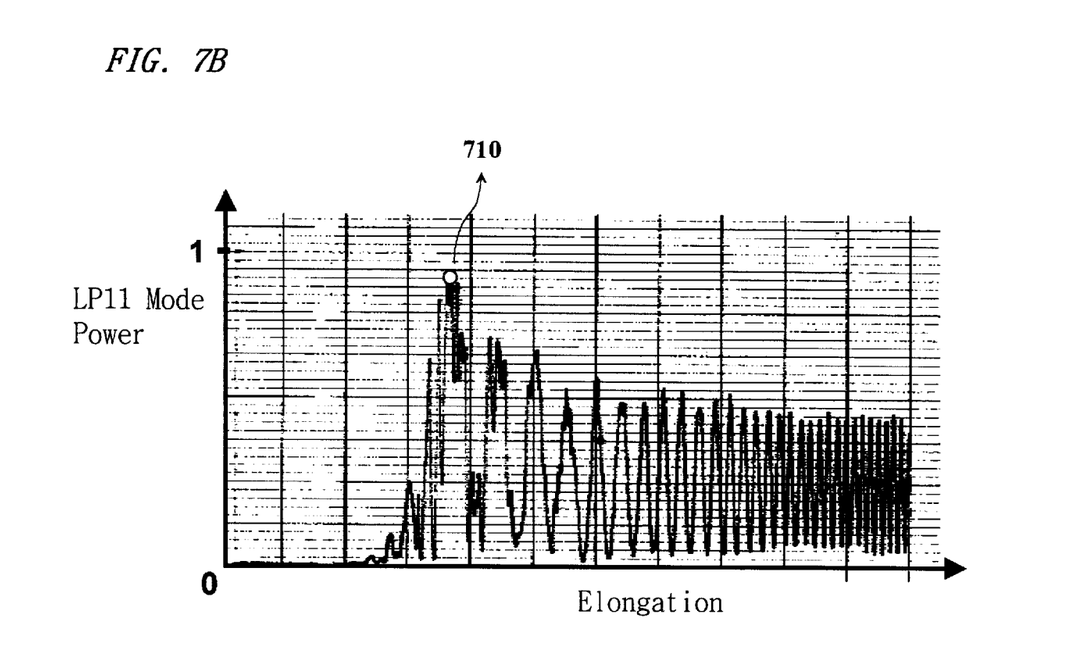
FIG. 7B is a graph showing the mode-coupling characteristics according to the extension of the fused-type mode-selective directional coupler fabricated according to the method as illustrated in FIG. 7A.

FIG. 7B is a graph illustrating the mode-coupling ratio vis-à-vis extension of the fused-type mode-selective directional coupler fabricated according to the method as illustrated above and in FIG. 7A. The graph in FIG. 7B shows the normalized intensity of light that has been mode-coupled to the LP11 mode at the output of the etched second TMF end 706 as shown in FIG. 7A. If the fused-type mode-selective directional coupler is fabricated by stopping the extension thereof when the intensity of the LP11 mode reaches its maximum 710, it is possible to achieve a mode-coupling ratio of 90%. If extension is carried out for longer than such duration, the phase-mismatch becomes larger and the mode-coupling ratio becomes smaller, and at the same time there arises loss of light due to mode-coupling to a different mode.

Figure 7C:
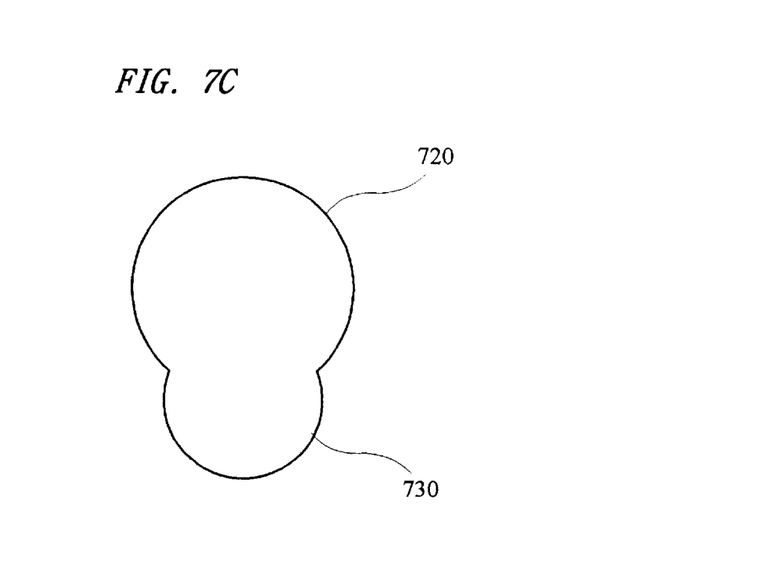
FIG. 7C is a cross-sectional view of the junction of the mode-selective directional coupler fabricated according to the method as illustrated in FIG. 7A.

FIG. 7C is a cross-sectional view of the junction of the mode-selective directional coupler fabricated according to the embodiment of the present invention. Referring to FIG. 7C, there is shown the cross-sectional view of a fused-type mode-selective directional coupler in which the fusion has been completed by using the etched TMF and the TMF taper. The etched TMF 720 and the TMF taper 730 are shown as having been fused at the junction of the directional coupler so that they are shaped like a dumbbell.

Figure 9:
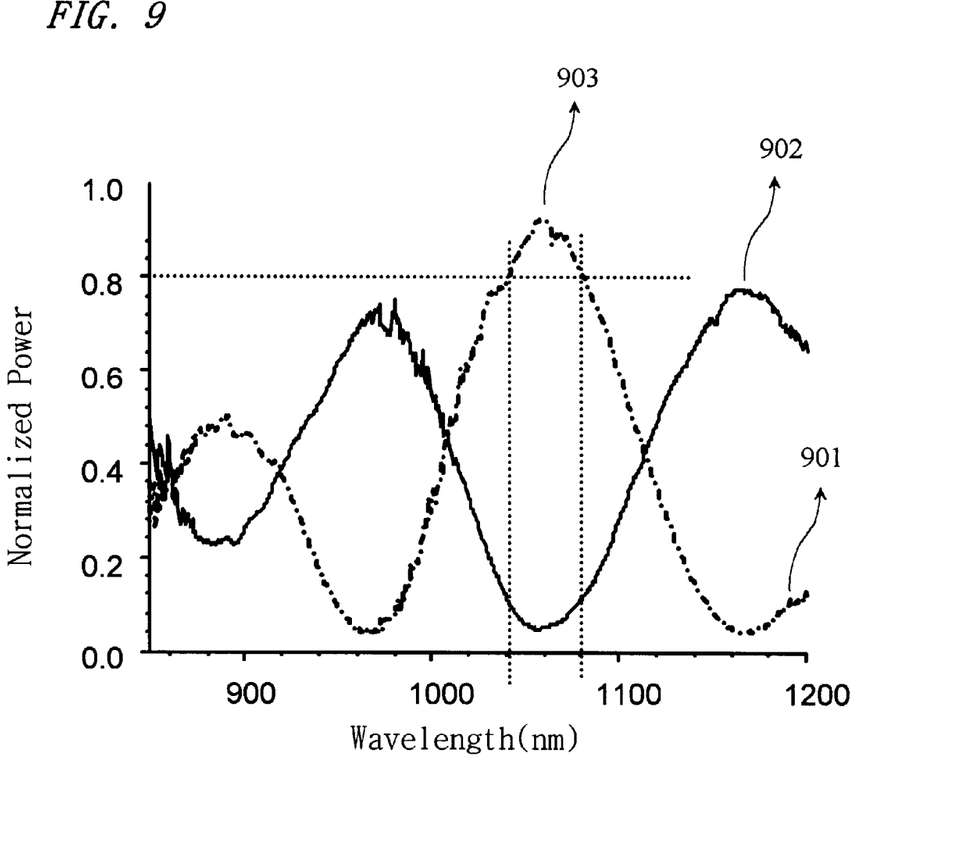
FIG. 9 is a graph illustrating the mode-coupling characteristics vis-à-vis wavelength of the fused-type mode-selective directional coupler fabricated according to the embodiment of the present invention.

FIG. 9 is a graph illustrating the mode-coupling characteristics vis-à-vis wavelength of the fused-type mode-selective directional coupler fabricated according to the embodiment of the present invention. FIG. 9 shows the change of directional coupling to the LP11 mode end 901 and the LP01 mode end 902 according to the change of wavelength, when wide-bandwidth light is incident to the LP01 mode end of the fused-type mode-selective directional coupler having a center wavelength of 1064 nm. The mode-coupling ratio 903 is greater than 80% within the 40 nm bandwidth centering 1064 nm.

Figure 10:
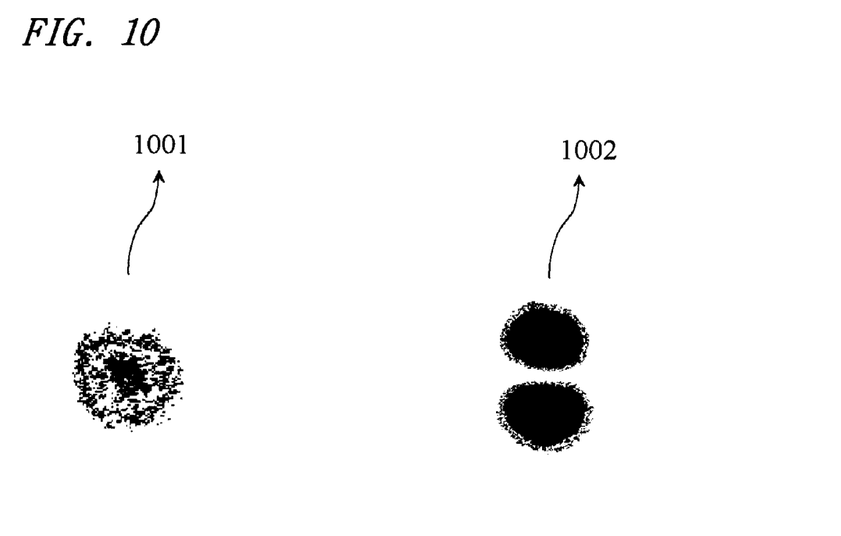
FIG. 10 is a diagram of the mode field that exists at the two ends of the fused-type mode-selective directional coupler fabricated according to the embodiment of the present invention when LP01 mode is input to the directional coupler.

FIG. 10 is the diagram of the mode field that exists at the two ends of the fused-type mode-selective directional coupler fabricated according to the embodiment of the present invention when the LP01 mode is input to the directional coupler. The mode-selective directional coupler has a mode-coupling ratio of 90%. Reference numerals 1001 and 1002 illustrates the far-field mode pattern of light coming out of the LP01 mode end 707 and the LP11 mode end 706 in FIG. 7A. In this case, the mode-extinction ratio of the LP01 mode and the LP11 mode at the LP11 mode end is approximately 25 dB.

According to the method of fabricating the mode-selective directional coupler of the present invention, it is not necessary to look for a SMF-TMF pair satisfying the phase-match condition. In addition, the mode-selective directional coupler of the present invention is more stable against change of temperature compared with conventional polished-type directional couplers that include material other than optical fibers and is easier to fabricate, because the mode-selective directional coupler of the present invention is an all-optical-fiber, fused-type directional coupler.

Although the present invention has been illustrated with reference to embodiments of the present invention, various modifications are possible within the scope of the present invention by a person skilled in the art. Therefore, the scope of the present invention should be defined not by the illustrated embodiments but by the attached claims.

What is claimed is:

1. A method of fabricating a fused-type mode-selective directional coupler in which a mode-coupling ratio between a first mode $M_1$ and a second mode $M_2$ different from the first mode $M_1$ equals a certain value, the method comprising the steps of:

preparing mode-coupling graphs including a mode-coupling curve C1 between the first mode $M_1$, and the second mode $M_2$, and mode-coupling curves C2 between the first mode $M_1$ and other modes different from the second mode $M_2$ by use of calculation data for a first optical fiber and a second optical fiber with cladding diameters formed by tapering and etching two identical optical fibers;

finding out particular initial cladding diameters $D_1$ of the first optical fiber and $D_2$ of the second optical fiber which enable the mode-coupling curve C1 and the mode-coupling curve C2 to be separated by more than 2 $\mu$m in a mode-coupling region and also enable a difference between a coupler-fabrication line and the mode-coupling curve C1 to be maintained at less than 1.5 $\mu$m in the mode-coupling region from the initial cladding diameters $D_1$ and $D_2$, where the coupler-fabrication line is a straight line from the particular initial cladding diameters toward an origin of the mode-coupling graph:

preparing, the first and second optical fibers, each having a core and a cladding, parts of a jacket of each of the first and second optical fibers being removed, the first optical fiber having a cladding diameter of $D_1$ and a normalized frequency of $V_1$, and the second optical fiber having a cladding diameter of $D_2$ and a normalized frequency of $V_2$, said $V_1$ being less than said $V_2$, wherein the first and second optical fibers are prepared by tapering and etching two identical optical fibers;

putting in contact the claddings of the first and second optical fibers to form a junction; measuring the mode-coupling ratio between the first mode $M_1$ of the first optical fiber and the second mode $M_2$ of the second optical fiber;

extending the first and second optical fibers in longitudinal directions while fusing the junction; and stopping extending the first and second optical fibers when the mode-coupling ratio between the first mode $M_1$ and the second mode $M_2$ reaches the certain value.

2. The method of fabricating a fused-type mode-selective directional coupler as claimed in claim 1, wherein the first and second optical fibers having an identical structure are two-mode optical fibers.

3. The method of fabricating a fused-type mode-selective directional coupler as claimed in claim 2, wherein the first mode $M_1$ is an LP01 mode and the second mode $M_2$ is an LP11 mode.

4. The method of fabricating a fused-type mode-selective directional coupler as claimed in claim 1, wherein the first and second optical fibers having an identical structure are single-mode optical fibers.

5. The method of fabricating a fused-type mode-selective directional coupler as claimed in claim 1, wherein the first mode $M_1$ is a core mode and the second mode $M_2$ is a cladding mode.

6. The method of fabricating a fused-type mode-selective directional coupler as claimed in claim 1, wherein the certain value at which extending of the first and second optical fibers is stopped is a maximum value of the mode-coupling ratio between the first mode $M_1$ and the second mode $M_2$.

7. The method of fabricating a fused-type mode-selective directional coupler as claimed in claim 2, wherein the two-mode optical fibers have elliptic cores, and arrangement planes of the first and second optical fibers are parallel with the elliptic cores at the junction such that mode-coupling occurs in a stable manner only in one lobe direction of an LP11 mode.

8. The method of fabricating a fused-type mode-selective directional coupler as claimed in claim 1, wherein the first and second optical fibers are elliptic-core optical fibers, and modes participating in mode-coupling are an LP01 mode for either one of the optical fibers and anti-symmetric higher-order mode for the other one.

9. The method of fabricating a fused-type mode-selective directional fibers, and modes participating in mode-coupling are an LP01 mode for either one of the coupler as claimed in claim 1, wherein the first and second optical fibers are circular-core optical optical fibers and symmetric higher-order mode for the other one.

* * * * *